(12) United States Patent
Oke et al.

(10) Patent No.: US 8,279,151 B2
(45) Date of Patent: Oct. 2, 2012

(54) DISPLAY DEVICE

(75) Inventors: Ryutaro Oke, Chiba (JP); Shisei Kato, Mobara (JP)

(73) Assignees: Hitachi Displays, Ltd., Chiba-ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 833 days.

(21) Appl. No.: 11/806,192

(22) Filed: May 30, 2007

(65) Prior Publication Data
US 2008/0042955 A1 Feb. 21, 2008

(30) Foreign Application Priority Data

May 31, 2006 (JP) .................................. 2006-151269

(51) Int. Cl.
| | |
|---|---|
| G09G 3/36 | (2006.01) |
| G02F 1/1333 | (2006.01) |
| G02F 1/1343 | (2006.01) |
| H01L 29/08 | (2006.01) |
| H01L 35/24 | (2006.01) |
| H01L 51/00 | (2006.01) |
| H01L 27/14 | (2006.01) |
| H01L 29/04 | (2006.01) |
| H01L 29/15 | (2006.01) |
| H01L 31/036 | (2006.01) |
| H01L 29/66 | (2006.01) |

(52) U.S. Cl. ................ 345/92; 349/54; 349/55; 257/40; 257/72; 257/353

(58) Field of Classification Search .................... 345/92, 345/93

See application file for complete search history.

(56) References Cited

U.S. PATENT DOCUMENTS
4,907,861 A 3/1990 Muto
(Continued)

FOREIGN PATENT DOCUMENTS
JP 61-153619 7/1986
(Continued)

OTHER PUBLICATIONS

Office Action from Japanese Patent Office dated Dec. 6, 2011, for corresponding Japanese Patent Application No. 2007-026754.

*Primary Examiner* — Alexander S Beck
*Assistant Examiner* — Charles V Hicks
(74) *Attorney, Agent, or Firm* — Stites & Harbison, PLLC; Juan Carlos A. Marquez, Esq

(57) ABSTRACT

The present invention efficiently arranges a spare TFT element in a pixel region of a liquid crystal display device. A display device includes a substrate on which TFT elements which are arranged in pixel regions each of which is surrounded by two neighboring scanning signal lines and two neighboring video signal lines are formed. The substrate arranges a first TFT element and a second TFT element in each pixel region in which the first TFT element and the second TFT element independently include a channel layer, a drain electrode and a source electrode respectively, only either one of the first TFT element and the second TFT element in each pixel region is operated when a video signal is applied to the video signal line and a scanning signal is applied to the scanning signal line, and the first TFT element and the second TFT element differ from each other in largeness or a shape of an occupied area or a channel width and a channel length of each TFT element when the substrate is viewed in a plan view.

13 Claims, 9 Drawing Sheets

U.S. PATENT DOCUMENTS

| | | | |
|---|---|---|---|
| 5,057,889 A * | 10/1991 | Yamada et al. | 257/353 |
| 5,410,164 A | 4/1995 | Katayama et al. | |
| 7,488,972 B2 * | 2/2009 | Morita et al. | 257/40 |
| 7,612,840 B2 | 11/2009 | Lai | |
| 2001/0028418 A1 * | 10/2001 | Ozaki et al. | 349/54 |
| 2005/0173707 A1 * | 8/2005 | Shiraki et al. | 257/72 |
| 2005/0225708 A1 | 10/2005 | Oke et al. | |
| 2007/0252146 A1 | 11/2007 | Yokomizo | |
| 2008/0129910 A1 | 6/2008 | Fujii et al. | |

FOREIGN PATENT DOCUMENTS

| | | |
|---|---|---|
| JP | 61-213880 | 9/1986 |
| JP | 61245136 | 10/1986 |
| JP | 2189522 | 7/1990 |
| JP | 2005-300821 | 10/2005 |
| JP | 2005-535147 | 11/2005 |
| JP | 2007-004106 | 1/2007 |
| JP | 2007-298791 | 11/2007 |

* cited by examiner

DISPLAY DEVICE

CLAIM OF PRIORITY

The present application claims priority from Japanese application serial No. 2006-151269, filed on May 31, 2006, the content of which is hereby incorporated by reference into this application.

BACKGROUND OF THE INVENTION

1. Field of the Invention

The present invention relates to a display device, and more particularly to a technique which is effectively applicable to a liquid crystal display device.

2. Description of Related Art

Conventionally, as a liquid crystal display device, there has been known an active-matrix type liquid crystal display device which uses TFT elements as switching elements. The active-matrix type liquid crystal display device is, for example, configured such that, on one substrate out of a pair of substrates which constitutes a liquid crystal display panel, a plurality of scanning signal lines, a plurality of video signal lines which stereoscopically intersects the plurality of scanning signal lines by way of an insulation layer, TFT elements and pixel electrodes which are arranged in pixel regions each of which is surrounded by two neighboring scanning signal lines and two neighboring video signal lines are arranged. Here, the TFT element which is arranged in each pixel region has a gate electrode thereof connected to the scanning signal line, a drain electrode thereof connected to the video signal line and a source electrode thereof connected to a pixel electrode. Hereinafter, the active-matrix type liquid crystal display device is simply referred to as a liquid crystal display device.

In the liquid crystal display device, when a malfunction occurs in the TFT element, it becomes impossible to apply a gray scale voltage (video signal) to the pixel electrode which is connected to the source electrode of the TFT element and hence, a point defect which is referred to as a dot omission phenomenon occurs. Accordingly, in a recent liquid crystal display device, there may be a case that a spare TFT element (also referred to as a floating TFT) is arranged in each pixel region (for example, see patent document 1).

With the provision of the spare TFT element in the pixel region, when the malfunction occurs in the TFT element which is used in an initial state, for example, by cutting away the drain electrode of the TFT element in which the malfunction occurs from the video signal line, by connecting the drain electrode of the spare TFT element to the video signal line, and by connecting the source electrode of the spare TFT element to the pixel electrode, it is possible to avoid the occurrence of the point defect.

Patent document 1: JP-A-7-104311

SUMMARY OF THE INVENTION

Here, in the conventional liquid crystal display device, in providing the spare TFT element, for example, in many cases, the spare TFT element has the same shape and the same size as the TFT element which is used in an initial state.

However, in the recent liquid crystal display device, along with demand for high definition and a high numerical aperture, it becomes difficult to arrange the spare TFT element having the same shape and the same size as the TFT element used in an initial state in one pixel region.

Further, when the liquid crystal display device adopts a lateral-electric-field driving method such as an IPS method, counter electrodes (also referred to as common electrodes) which face the pixel electrodes are arranged on a substrate on which the TFT elements and the pixel electrodes are arranged. As the liquid crystal display device of the lateral-electric-field driving method, for example, there has been known a liquid crystal display device in which counter electrodes are arranged to overlap pixel electrodes by way of an insulation layer as viewed in a plan view and two counter electrodes arranged on both sides of the scanning signal line are connected by a bridge line which stereoscopically intersects the scanning signal line. In such a liquid crystal display device, it is necessary to arrange a spare TFT element such that the spare TFT element and the bridge line do not overlap each other as viewed in a plan view. Accordingly, this makes the arrangement of the spare TFT element further difficult.

It is an object of the present invention to provide a technique which can efficiently arrange a spare TFT element in a pixel region of a liquid crystal display device, for example.

It is an object of the present invention to provide a technique which can prevent the occurrence of a point defect of a display region of a liquid crystal display device, for example.

The above-mentioned and other objects and novel features of the present invention will become apparent by the description of this specification and attached drawings.

To briefly explain the summary of typical inventions among inventions disclosed in this application, they are as follows.

(1) In a display device which includes a substrate on which a plurality of scanning signal lines, a plurality of video signal lines which stereoscopically intersects the plurality of scanning signal lines by way of an insulation layer, and TFT elements and pixel electrodes which are arranged in pixel regions each of which is surrounded by two neighboring scanning signal lines and two neighboring video signal lines are formed, the substrate arranges a first TFT element and a second TFT element in each pixel region in which the first TFT element and the second TFT element independently include a channel layer, a drain electrode and a source electrode respectively, only either one of the first TFT element and the second TFT element in each pixel region is operated when a video signal is applied to the video signal line and a scanning signal is applied to the scanning signal line, and the first TFT element and the second TFT element differ from each other in a largeness or a shape of an occupied area or a channel width and a channel length of each TFT element when the substrate is viewed in a plan view.

(2) In the display device having the constitution (1), the drain electrode and the source electrode of the second TFT element include a region which overlaps the scanning signal line and a region which does not overlap the scanning signal line when the substrate is viewed in a plan view.

(3) In the display device having the constitution (1) or (2), the scanning signal line includes a cutout portion where a width of the scanning signal line is narrowed when the substrate is viewed in a plan view, and end portions of the respective drain electrode and the source electrode of the second TFT element are positioned on the cutout portion when the substrate is viewed in a plan view.

(4) In the display device having any one of constitutions (1) to (3), the pixel electrode forms a cutout portion on a side thereof which faces the scanning signal line in an opposed manner when the substrate is viewed in a plan view, and end portions of the respective drain electrode and source electrode of the second TFT element are positioned on the cutout portion when the substrate is viewed in a plan view.

(5) In the display device having any one of constitutions (1) to (4), the substrate includes common electrodes which are arranged for the respective pixel regions and bridge lines each of which stereoscopically intersects the scanning signal line and is connected to the common electrodes arranged on both sides of the scanning signal line, the substrate includes first pixel regions each of which allows the common electrode to be electrically connected to the common electrode of other pixel region using the bridge line and second pixel regions each of which prevents the common electrodes from being connected to the common electrode of other pixel region, and the second TFT element which is arranged in the first pixel region and the second TFT element which is arranged in the second pixel region differ from each other in a largeness or a shape of an occupied area or a channel width and a channel length of each TFT element when the substrate is viewed in a plan view.

(6) In the display device having the constitution (5), the second TFT element which is arranged in the first pixel region is arranged between the first TFT element which is arranged in the first pixel region and the bridge line.

(7) In the display device having any one of constitutions (1) to (6), the second TFT element which is arranged in the first pixel region is a transistor element having a U-shaped drain electrode, and the second TFT element which is arranged in the second pixel region is a transistor element in which a drain electrode and a source electrode are arranged in parallel to each other.

(8) In the display device having any one of constitutions (1) to (4), the first TFT element is a transistor element having a U-shaped drain electrode, and the second TFT element is a transistor element in which a drain electrode and a source electrode are arranged in parallel to each other.

(9) In the display device having any one of constitutions (1) to (8), the first TFT element and the second TFT element are equal to each other in a value which is obtained by dividing the channel width by the channel length.

(10) In the display device having any one of constitutions (1) to (9), the substrate constitutes one substrate of a liquid crystal display panel.

The display device of the present invention arranges the first TFT element and the second TFT element in each pixel region in which the first TFT element and the second TFT element independently include the channel layer, the drain electrode and the source electrode respectively. Here, only either one of the first TFT element and the second TFT element in each pixel region is operated when a video signal is applied to the video signal line and a scanning signal is applied to the scanning signal line. Further, the first TFT element and the second TFT element are formed into TFT elements which differ from each other in largeness or a shape of the occupied area or the channel width and the channel length of each TFT element when the substrate is viewed in a plan view. To be more specific, assuming the first TFT element as a TFT element which is used in an initial state, with respect to the second TFT element which constitutes the spare TFT element, the occupied area or the shape of the second TFT element when the substrate is viewed in a plan view is set smaller than the occupied area or the shape of the first TFT element, for example. Alternatively, the first TFT element and the second TFT element are formed into TFT elements which differ from each other in the channel width and the channel length. In this manner, the spare TFT element can be effectively arranged and can prevent the occurrence of a point defect in the display device.

Further, assuming the TFT element which is used in an initial state as the first TFT element and the spare TFT element as the second TFT element, for example, when a malfunction occurs in the first TFT element in an operation inspection which is performed after the substrate is completed or the like, a correction operation is performed by removing the first TFT element having the malfunction from the video signal line and by connecting the second TFT element to the video signal line. In this correcting operation, an opening is formed in the video signal line or an insulation layer arranged above the drain electrode and the source electrode of the second TFT element by radiating laser beams and, for example, using a laser CVD film, the drain electrode of the second TFT element and the video signal line are connected respectively with each other, and the source electrode of the second TFT element and the pixel electrode PX are respectively connected with each other. Accordingly, it is desirable that the drain electrode and the source electrode of the second TFT element arrange regions where the drain electrode and the source electrode do not overlap the scanning line when the substrate is viewed in a plan view. Due to such a constitution, when the opening is formed in the insulation layer arranged above the drain electrode and the source electrode of the second TFT element, the opening can be formed in a region where the drain electrode and the source electrode do not overlap the scanning signal line and hence, and therefore it is possible to reduce the possibility that the drain electrode or the source electrode of the second TFT element is short-circuited with the scanning signal lines.

Further, by forming the cutout portion in the scanning signal line and by arranging the end portion of the drain electrode or the source electrode of the second TFT element above the cutout portion when the substrate is viewed in a plan view, it is possible to prevent a numerical aperture from being lowered attributed to the projection of the drain electrode and the source electrode of the second TFT element.

Here, the pixel electrode may form the cutout portion on not only the scanning signal line but also on a side thereof which faces the scanning signal line when the substrate is viewed in a plan view, for example.

Further, when the liquid crystal display device adopts a lateral-electric-field driving method such as an IPS method, counter electrodes which face the above-mentioned pixel electrodes in an opposed manner are formed on a substrate on which the TFT elements and the pixel electrodes are formed. In the liquid crystal display device adopting the lateral-electric-field driving method, for example, the counter electrodes are arranged to overlap the pixel electrodes by way of an insulation layer in a plan view and, at the same time, two counter electrodes which are arranged on both sides of the scanning signal line are connected by a bridge line which stereoscopically intersect the scanning signal lines. In such a liquid crystal display device, it is necessary to arrange the spare TFT elements such that the spare TFT elements do not overlap the bridge line in a plan view.

In this manner, when the common electrode includes the first pixel region which is electrically connected with the common electrodes of another pixel region using the bridge line and the second pixel region which is not electrically connected with the common electrodes of another pixel region, with respect to the second TFT element arranged in the first pixel region and the second TFT element arranged in the second pixel region, by changing the largeness or the shape of the occupied area or the channel width or the channel length of each TFT element when the substrate is viewed in a plan view, it is possible to efficiently arrange the second TFT elements (spare TFT element) in all pixel regions thus preventing point defects of the display device.

Here, it is desirable that the second TFT element which is arranged in the first pixel region is arranged between the first TFT element arranged in the first pixel region and the bridge line. When the bridge line is provided, the drain electrode of the first TFT element is connected to the video signal line extending in the direction opposite to the direction along which the bridge line is provided as viewed from the first TFT element. Accordingly, by arranging the second TFT element between the first TFT element and the bridge line, when the drain line of the second TFT element and the video signal line are connected to each other, a connection line is not required to get over the bridge line and hence, the drain electrode of the second TFT element and the video signal line can be connected with a shortest distance.

Further, in arranging the second TFT elements which differ in the largeness or the shape of the occupied area or the channel width and the channel length of each TFT element when the substrate is viewed in a plan view in the first pixel region and the second pixel region, for example, the transistor element having the U-shaped drain electrode is arranged in the first pixel region, and the transistor element which arranges the drain electrode and the source electrode in parallel each other is arranged in the second pixel region.

Further, with respect to the first TFT element and the second TFT element, in arranging the second TFT element which differ in the largeness or the shape of the occupied area or the channel width and the channel length of each TFT element when the substrate is viewed in a plan view, for example, the first TFT element is formed of the transistor element which includes the U-shaped drain electrode, and the second TFT element is formed of the transistor element which arranges the drain electrode and the source electrode in parallel to each other.

Still further, it is desirable that the first TFT element and the second TFT element are equal, for example, in a value which is obtained by dividing the channel width by the channel length.

Further, with respect to the display device having the substrate which arranges the first TFT element and the second TFT element in one pixel region which is surrounded by two neighboring scanning signal lines and two neighboring video signal lines, it is particularly desirable to apply the present invention to a liquid crystal display panel which uses the above-mentioned substrate as one substrate of a liquid crystal display panel.

DESCRIPTION OF THE PREFERRED EMBODIMENT

Hereinafter, the present invention is explained in detail in conjunction with an embodiment by reference to the drawings.

Here, in all drawings for explaining the embodiment, parts having identical functions are given same symbols and their repeated explanation is omitted.

FIG. 1 to FIG. 5 are schematic views showing one constitutional example of a display panel to which the present invention is applied.

Figure 1:
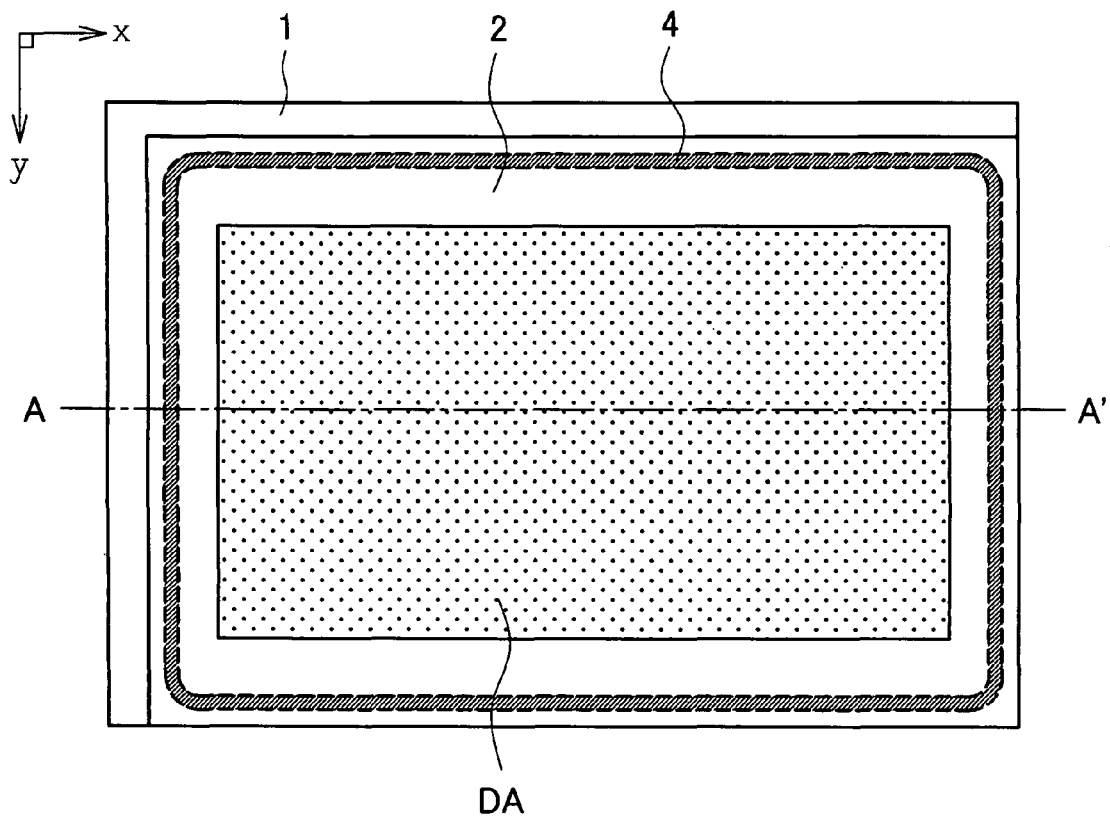
FIG. 1 is a schematic plan view of a liquid crystal display panel as viewed from a viewer side.
Figure 2:
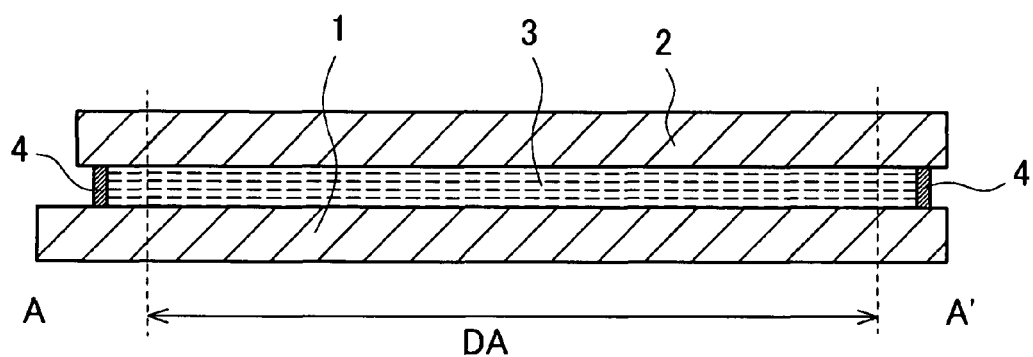
FIG. 2 is a schematic cross-sectional view taken along a line A-A' in FIG. 1.
Figure 3:
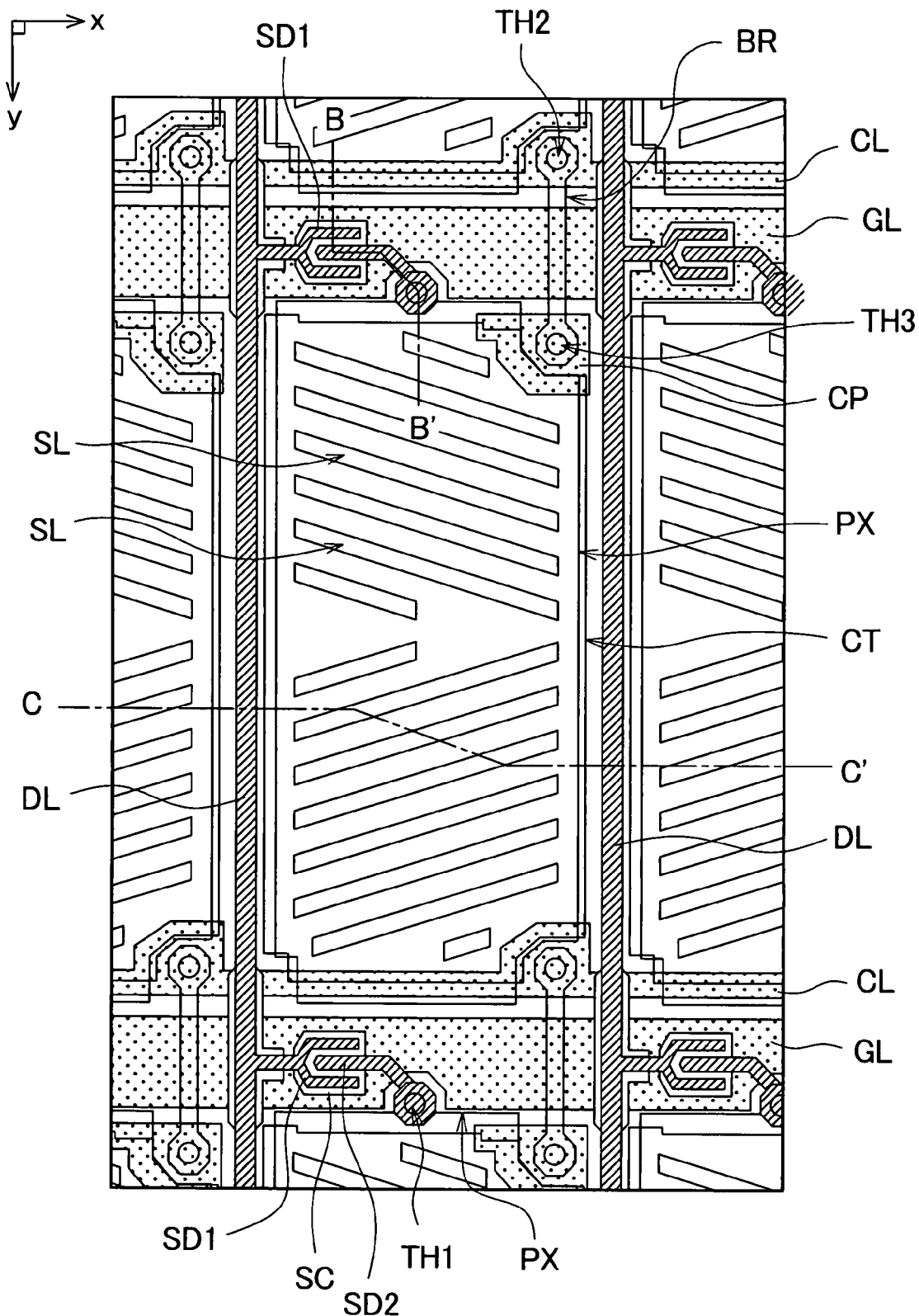
FIG. 3 is a schematic plan view showing a constitutional example of one pixel in a display region on a TFT substrate of the liquid crystal display panel.
Figure 4:
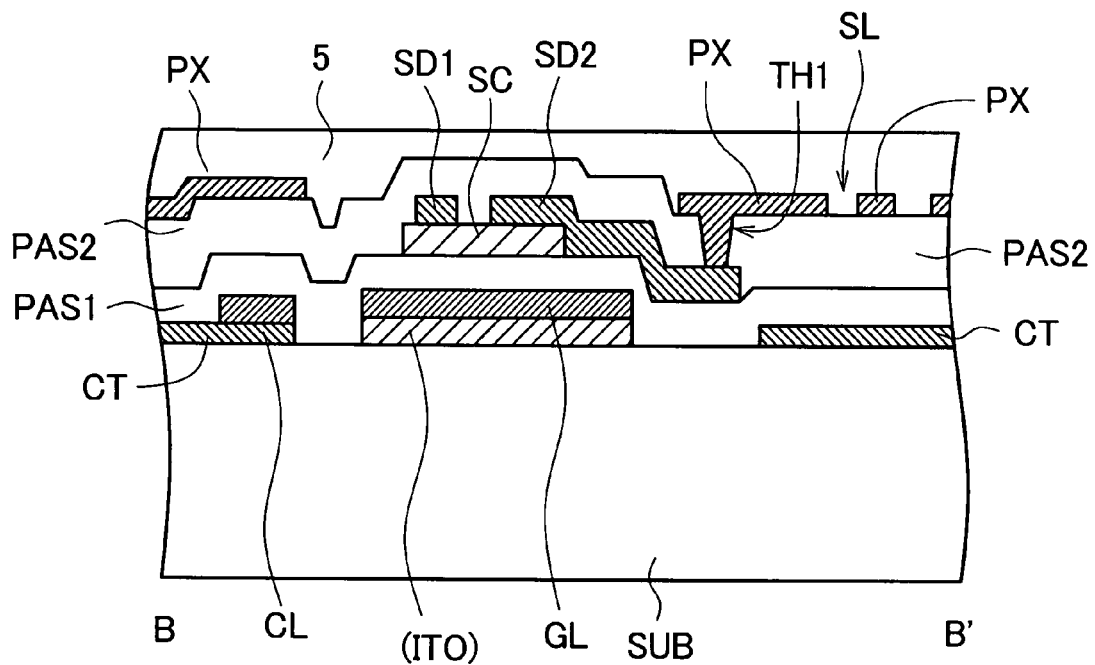
FIG. 4 is a schematic cross-sectional view taken along a line B-B' in FIG. 3.
Figure 5:
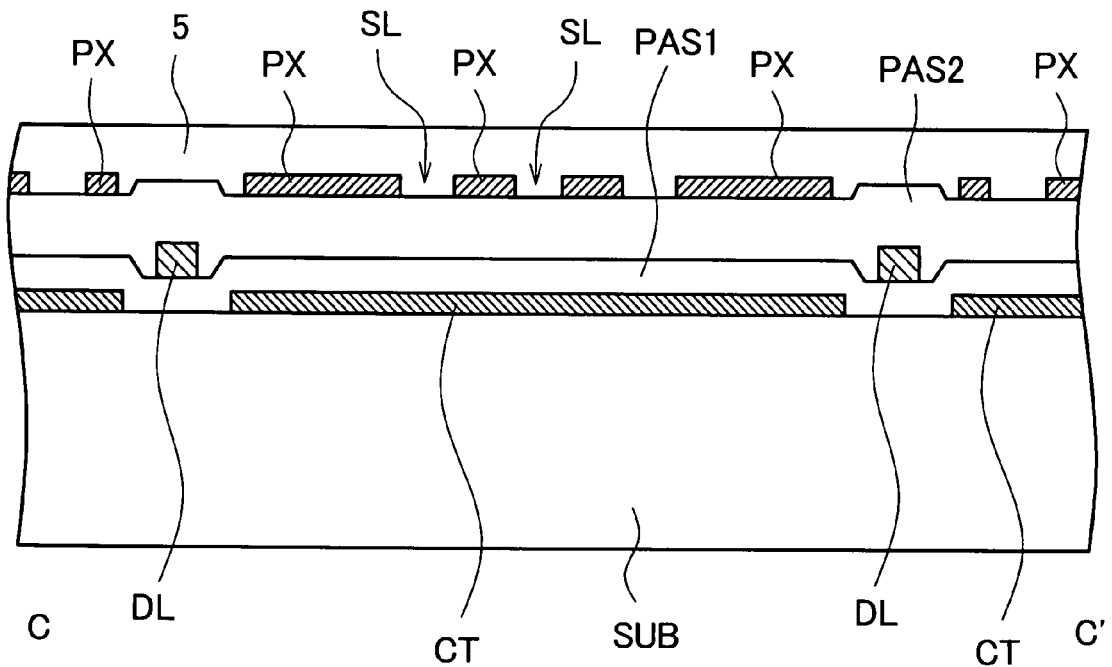
FIG. 5 is a schematic cross-sectional view taken along a line C-C' in FIG. 3.

FIG. 1 is a schematic plan view of a liquid crystal display panel as viewed from a viewer side. FIG. 2 is a schematic cross-sectional view taken along a line A-A' in FIG. 1. FIG. 3 is a schematic plan view showing a constitutional example of one pixel in a display region on a TFT substrate of the liquid crystal display panel. FIG. 4 is a schematic cross-sectional view taken along a line B-B' in FIG. 3. FIG. 5 is a schematic cross-sectional view taken along a line C-C' in FIG. 3.

The present invention relates to a display device including a substrate on which a plurality of scanning signal lines, a plurality of video signal lines which stereoscopically intersects the plurality of scanning signal lines by way of an insulation layer, and TFT elements and pixel electrodes which are arranged in pixel regions each of which is surrounded by two neighboring scanning signal lines and two neighboring video signal lines are formed. Such a substrate is used as one substrate (TFT substrate) out of a pair of substrates which constitutes the liquid crystal display panel.

The liquid crystal display panel is, for example, as shown in FIG. 1 and FIG. 2, a display panel which seals a liquid crystal material 3 between a pair of substrates 1, 2. Here, the pair of substrates 1, 2 is adhered to each other with a sealing material 4 which is annularly arranged outside a display region DA. The liquid crystal material 3 is sealed in a space surrounded by the pair of substrates 1, 2 and the sealing material 4.

Out of the pair of substrates 1, 2, the substrate 1 having a larger profile size as viewed from a viewer side is generally referred to as a TFT substrate. Although not shown in FIG. 1 and FIG. 2, the TFT substrate 1 is configured such that on a surface of a transparent substrate such as a glass substrate, the plurality of scanning signal lines, and the plurality of video signal lines which stereoscopically intersects the plurality of scanning signal lines by way of an insulation layer are formed. A region which is surrounded by two neighboring scanning signal lines and two neighboring video signal lines corresponds to one pixel region, and a TFT element, a pixel electrode and the like are arranged for each pixel region. Further, another substrate 2 which makes the pair with the TFT substrate 1 is generally referred to as a counter substrate.

When the liquid crystal display panel adopts, for example, a driving method referred to as a vertical-electric-field method such as a TN method or a VA method, counter electrodes (also referred to as common electrodes) which face the pixel electrodes of the TFT substrate 1 are arranged on a counter substrate 2 side. Further, when the liquid crystal display panel adopts a driving method which is referred to as a lateral-electric-field method such as an IPS method, for example, the counter electrodes are formed on a TFT substrate 1 side.

Next, a constitutional example of one pixel in a display region DA of the liquid crystal display panel is briefly explained in conjunction with FIG. 3 to FIG. 5.

The present invention may preferably be applied to a liquid crystal display panel, and more particularly to a lateral-electric-field-method liquid crystal display panel in which one pixel of the TFT substrate 1 is constituted as shown in FIG. 3 to FIG. 5. Here, the TFT substrate 1 is, for example, as shown in FIG. 3 to FIG. 5, configured such that on a surface of the glass substrate SUB, the plurality of scanning signal lines GL which extends in the x direction is formed, and over the scanning signal lines GL, the plurality of video signal lines DL which extends in the y direction and stereoscopically intersects the plurality of scanning signal lines GL by way of a first insulation layer PAS1 is formed. Further, the region which is surrounded by two neighboring scanning signal lines GL and two neighboring video signal lines DL corresponds to one pixel region.

Further, on the surface of the glass substrate SUB, for example, a planar counter electrode CT is formed for every pixel region. Here, the counter electrodes CT of the respective pixel regions arranged in the x direction are electrically connected with a common signal line CL arranged parallel to the scanning signal line GL. Further, as viewed from the scanning signal line GL, on a side opposite to the direction along which the common signal line CL is arranged, a common connection pad CP which is electrically connected with the counter electrode CT is provided. Further, for example, in forming the counter electrodes CT, the scanning signal lines GL, the common signal lines CL and the like, these parts may be collectively formed by patterning using a metal film such as an ITO film, an aluminum film or the like. In this case, the ITO film is interposed (remains) between the scanning signal lines GL and the substrate SUB.

Further, over the first insulation layer PAS1, besides the video signal lines DL, semiconductor layers, drain electrodes SD1 and source electrode SD2 are formed. Here, the semiconductor layers are formed using amorphous silicon (a-Si), for example. The semiconductor layers are constituted of not only semiconductor layers having a function of channel layers SC of TFT elements which are arranged for respective pixel regions but also semiconductor layers which prevent short-circuiting between the scanning signal lines GL and the video signal lines DL at regions where the scanning signal lines GL and the video signal lines DL stereoscopically intersect each other (not shown in the drawing). Here, to the semiconductor layer which has the function of the channel layer SC of the TFT element, both of the drain electrode SD1 and the source electrode SD2 which are connected to the video signal line DL are connected.

Further, over a surface (layer) on which the video signal lines DL and the like are formed, the pixel electrodes PX are formed by way of a second insulation layer PAS2. The pixel electrodes PX are electrodes which are arranged independently for respective pixel regions, wherein the pixel electrode PX is electrically connected with the source electrode SD2 at an opening portion (through hole) TH1 which is formed in the second insulation layer PAS2. Further, when the counter electrode CT and the pixel electrode PX are, as shown in FIG. 3 to FIG. 5, arranged in a stacked manner by way of the first insulation layer PAS1 and the second insulation layer PAS2, the pixel electrode PX is formed of a comb-teeth electrode in which slits SL are formed.

Further, over the second insulation layer PAS2, besides the pixel electrodes PX, for example, bridge lines BR each of which electrically connects two counter electrodes CT arranged vertically with the scanning signal line GL sandwiched therebetween are formed. Here, the bridge line BR is connected with the common signal line CL and a common connection pad CP which are arranged with the scanning signal line GL sandwiched therebetween via through holes TH2, TH3.

Further, over the second insulation layer PAS2, an orientation film 5 is formed to cover the pixel electrodes PX and the bridge lines BR. Here, although not shown in the drawing, the counter substrate 2 is arranged to face the surface of the TFT substrate 1 on which the orientation film 5 is formed.

Hereinafter, a constitutional example in which the present invention is applied to the TFT substrate 1 having the constitution shown in FIG. 3 to FIG. 5, and the manner of operation and the advantageous effects of the constitutional example are explained.

Specific Embodiment

Figure 6:
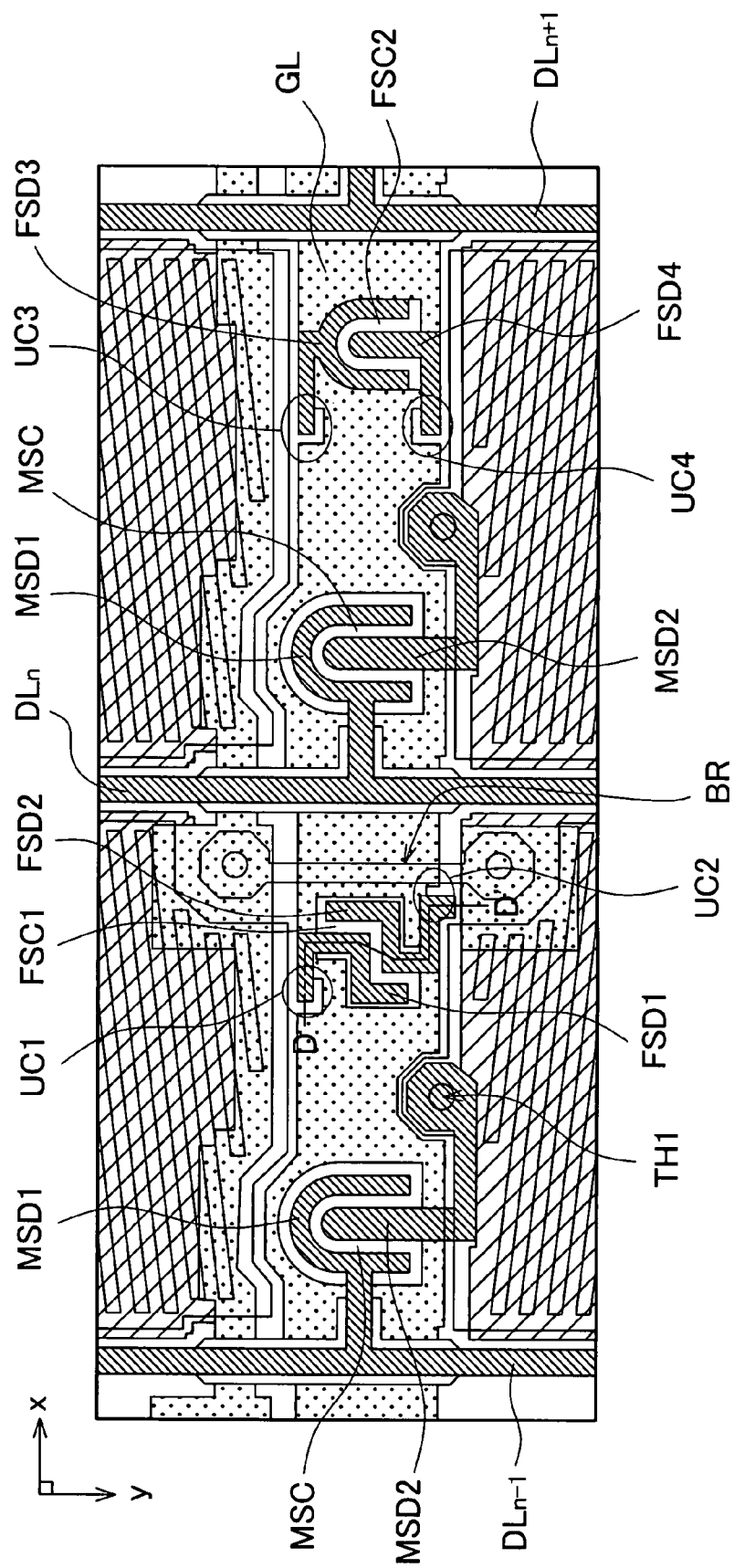
FIG. 6 is a schematic plan view showing a constitutional example of a TFT element on a TFT substrate of this embodiment.
Figure 7:
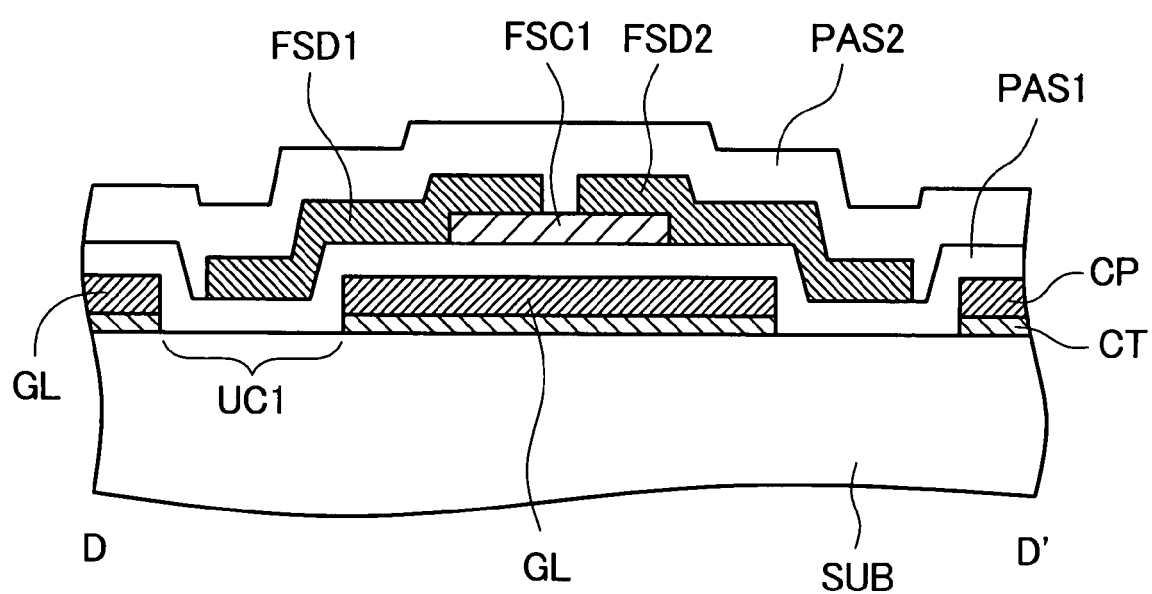
FIG. 7 is a schematic cross-sectional view taken along a line D-D' in FIG. 6.

FIG. 6 and FIG. 7 are schematic views showing the schematic constitution of the TFT substrate of one specific embodiment according to the present invention.

FIG. 6 is a schematic plan view showing a constitutional example of a TFT element of the TFT substrate of this embodiment. FIG. 7 is a schematic cross-sectional view taken along a line D-D' in FIG. 6.

The TFT substrate 1 of this embodiment is a TFT substrate which is used in a liquid crystal display panel of a lateral-electric-field driving method in which one pixel is configured as shown in FIG. 3 to FIG. 5. Further, in the TFT substrate of this embodiment, in one pixel region which is surrounded by two neighboring scanning signal lines and two neighboring video signal lines, a first TFT element which is used in an initial state and a second TFT element (spare TFT element) which is used when a malfunction occurs in the first TFT element are arranged.

Further, in the TFT substrate 1 shown in FIG. 3 to FIG. 5, the counter electrodes CT which are arranged on both sides of one scanning signal line GL are electrically connected with each other using a common bus line (not shown in the drawing) which is arranged outside the display region DA. Accordingly, it is unnecessary to arrange the bridge line BR which connects the counter electrodes CT arranged on both sides of one scanning signal line GL in all pixel regions. For example, as shown in FIG. 6, the pixel regions are constituted of two kinds of pixel regions, that is, the first pixel regions in which the bridge line BR is arranged and the second pixel regions in which the bridge line BR is not arranged.

Here, the first TFT element which is arranged in the first pixel region in which the bridge lien BR is arranged between two neighboring video signal lines $DL_{n-1}$, $DL_n$ and the second pixel region in which the bridge line BR is not arranged between two neighboring video signal lines $DL_n$, $DL_{n+1}$ and is used in the initial state is, as shown in FIG. 6, constituted of the scanning signal line GL, a semiconductor layer (channel layer) MSC, a drain electrode MSD1 and a source electrode MSD2. Further, the drain electrode MSD1 of the first TFT element is connected to the video signal line DL, and the source electrode MSD2 is connected to the pixel electrode PX.

Further, the second TFT element which is arranged in the first pixel region is constituted of the scanning signal line GL, a semiconductor layer FSC1, a drain electrode FSD1 and a source electrode FSD2. The semiconductor layer FSC1, the drain electrode FSD1 and the source electrode FSD2 are arranged independently from the semiconductor layer (channel layer) MSC, the drain electrode MSD1 and the source electrode MSD2 of the first TFT element.

In the same manner, the second TFT element which is arranged in the second pixel region is constituted of the scanning signal line GL, a semiconductor layer FSC2, a drain electrode FSD3 and a source electrode FSD4. The semiconductor layer FSC2, the drain electrode FSD3 and the source electrode FSD4 are arranged independently from the semiconductor layer (channel layer) MSC, the drain electrode MSD1 and the source electrode MSD2 of the first TFT element.

Still further, as in the case of the first pixel region and the second pixel region, when theses pixel regions differ from each other with respect to an area in which the second TFT element can be arranged, the second TFT element which is arranged in the first pixel region and the second TFT element which is arranged in the second pixel region differ from each other in largeness or a shape of an occupied area or a channel width and a channel length of each TFT element when the substrate is viewed in a plan view. For example, TFT elements shown in FIG. 6 having shapes different from each other are arranged.

There may be a case that when the first TFT element used in an initial state has a defect (malfunction) and such a defect (malfunction) remains as it is, a point defect, that is, a normally black display or a normally white display occurs. The second TFT element is a spare TFT element which is provided for correcting such a point defect by changing over a switching element corresponding to the pixel region from the first TFT element to the second TFT element. Due to such a constitution, in the second TFT element, it is desirable that largeness and a shape of an occupied area of the second TFT element when the substrate is viewed in a plan view are set equal to largeness and a shape of an occupied area of the first TFT element.

However, the present invention primarily provided for obviating the occurrence of the point defect, that is, the occurrence of the normally black display or the normally white display. Accordingly, the largeness and shape of the occupied area of the second TFT element when the substrate is viewed in a plan view may be set smaller than the largeness and shape of the first TFT element.

Further, with respect to a value (W/L) which is obtained by dividing a channel width W by a channel length L in the first TFT element and the second TFT element which are arranged in the respective pixel regions, it is desirable that the respective TFT elements have the same value.

Further, for example, as shown in FIG. 6 and FIG. 7, it is desirable that the scanning signal line GL forms a cutout portion UC1 at a position thereof where the scanning signal line GL overlaps an end portion of the drain electrode FSD1 of the second TFT element arranged in the first pixel region as viewed in a plan view and forms a cutout portion UC2 at a position where the scanning signal line GL overlaps an end portion of the source electrode FSD2 as viewed in a plan view. In the same manner, it is desirable that the scanning signal line GL forms a cutout portion UC3 at a position thereof where the scanning signal line GL overlaps an end portion of the drain electrode FSD3 of the second TFT element arranged in the second pixel region as viewed in a plan view and forms a cutout portion UC4 at a position thereof where the scanning signal line GL overlaps the source electrode FSD4 as viewed in a plan view.

Still further, it is desirable that the cutout portion UC2 which is formed at the position where the scanning signal line GL overlaps the end portion of the source electrode FSD2 of the second TFT element arranged in the first pixel region as viewed in a plan view is, as shown in FIG. 6, arranged in the vicinity of the bridge line BR. With respect to the vicinity of the bridge line BR, a space defined between the bridge line BR and the pixel electrode PX is made large and hence, by arranging the end portion of the source electrode FSD2 in the space, it is possible to decrease a cutout size of the cutout portion UC2 of the scanning signal line GL.

Figure 8:
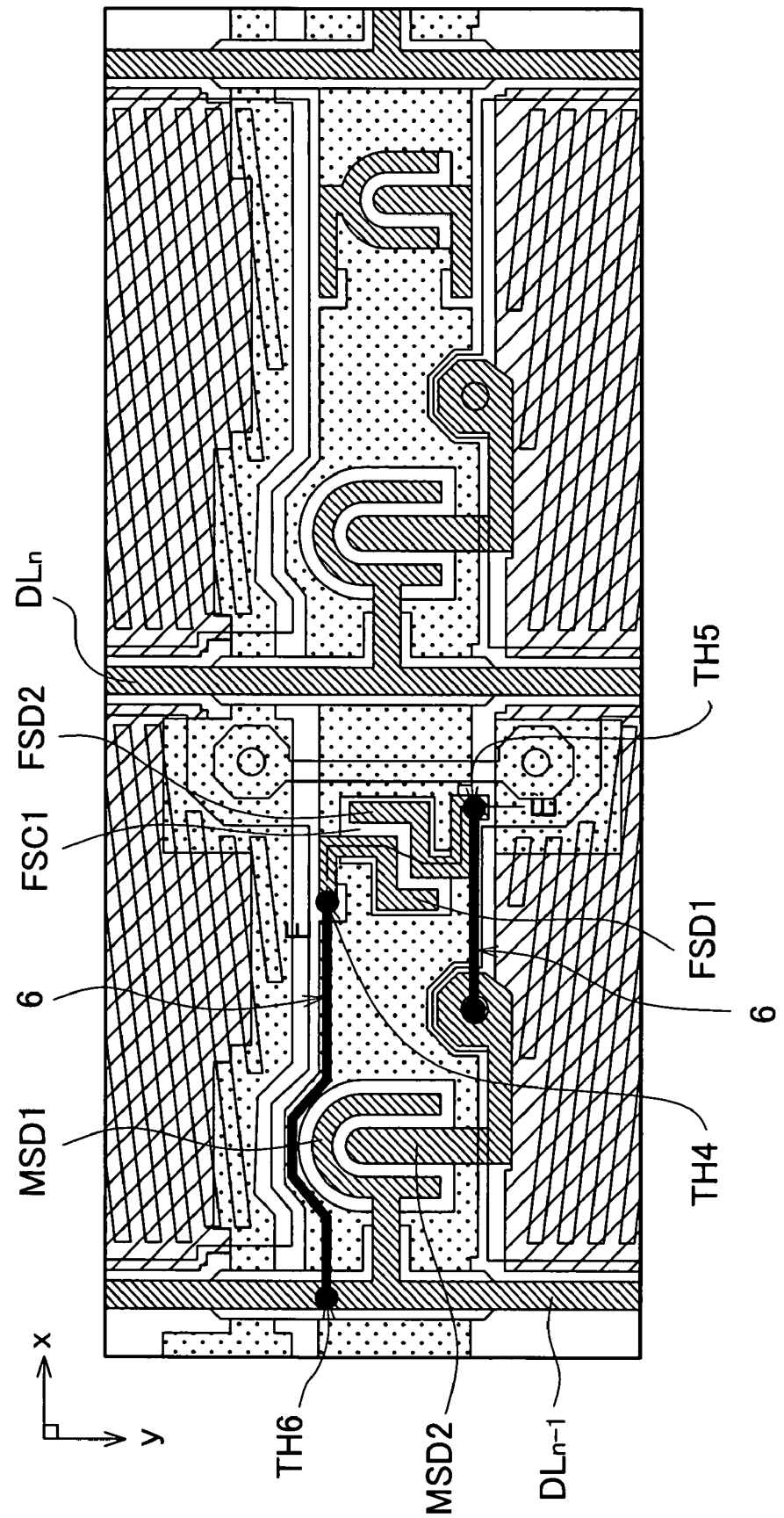
FIG. 8 is a schematic plan view for explaining one example of a correcting method.
Figure 9:
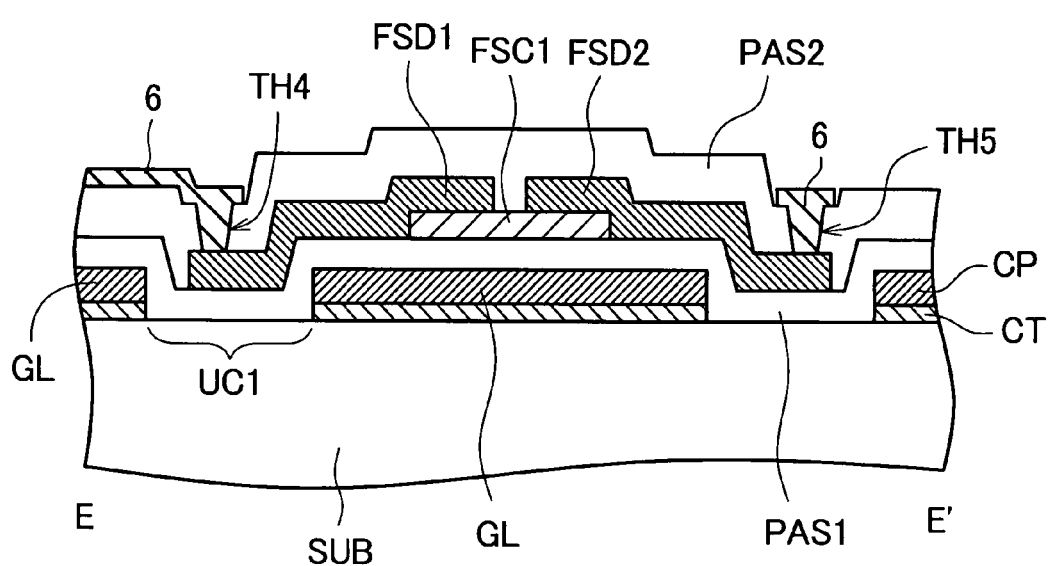
FIG. 9 is a schematic cross-sectional view taken along a line E-E' in FIG. 8.

FIG. 8 and FIG. 9 are schematic views for explaining a correcting method of the TFT substrate of this embodiment.

FIG. 8 is a schematic plan view for explaining one example of the correcting method. FIG. 9 is a schematic cross-sectional view taken along a line E-E' in FIG. 8.

The TFT substrate 1 of this embodiment is manufactured in the same manner as a conventional TFT substrate and, in a step for forming the semiconductor layer (channel layer) of the TFT element, in addition to a channel layer MSC of the first TFT element which is used in an initial state, channel layers FSC1, FSC2 of the second TFT element are formed. Further, in a step for forming a video signal line DL and the like, in addition to a drain electrode MSD1 and a source electrode MSD2 of the first TFT element which is used in an initial state, drain electrodes FSD1, FSD3 and source electrodes FSD2, FSD4 of the second TFT element are formed.

Further, after manufacturing the TFT substrate 1 in accordance with the conventional steps, for example, an inspection is performed for checking whether the first TFT elements arranged in the respective pixel regions are normally operated or not.

In this inspection, for example, when a defect exists and a malfunction occurs in the channel layer MSC, the drain electrode MSD1 or the source electrode MSD2 of the first TFT element arranged in the first pixel region shown in FIG. 6, that is, in a space defined between two neighboring video signal lines $DL_{n-1}$, $DL_n$, a correction to change over the TFT element (switching element) in the first pixel region from the first TFT element to the second TFT element is performed.

This correction is performed, for example, first of all, as shown in FIG. 8, by cutting away the drain electrode MSD1 of the first TFT element from the video signal line $DL_{n-1}$, and by cutting away the source electrode MSD2 from the pixel electrode PX.

Next, for example, as shown in FIG. 9, through holes TH4, TH5 are formed in portions of the second insulation layer PAS2 which are arranged above the end portion of the drain electrode FSD1 and the end potion of the source electrode FSD2 of the second TFT element, and, at the same time, a through hole TH6 is formed in a portion of the second insulation layer PAS2 which is arranged above the video signal line $DL_{n-1}$. Here, the respective through holes TH4, TH5, TH6 are, for example, formed by radiating laser beams.

Next, for example, as shown in FIG. 8 and FIG. 9, using a conductive film 6, the end portion of the drain electrode FSD1 of the second TFT element and the video signal line $DL_{n-1}$ are electrically connected with each other and, at the same time, the source electrode FSD2 and the pixel electrode PX are electrically connected with each other. The conductive film 6 is, for example, formed of a laser CVD film.

Here, by forming the cutout portions UC1, UC2 in the scanning signal line GL and by forming the through holes TH4, TH5 at positions where the through holes TH4, TH5 do not overlap the scanning signal line as viewed in a plan view, the through holes TH4, TH5 penetrate the drain electrode FSD1 or the source electrode FSD2 and arrive at the scanning signal line GL which constitutes a lower layer and hence, it is possible to prevent the occurrence of short-circuiting attributed to the conductive film 6. Accordingly, the malfunction (point defect) which occurs in the first pixel region can be easily corrected.

Figure 10:
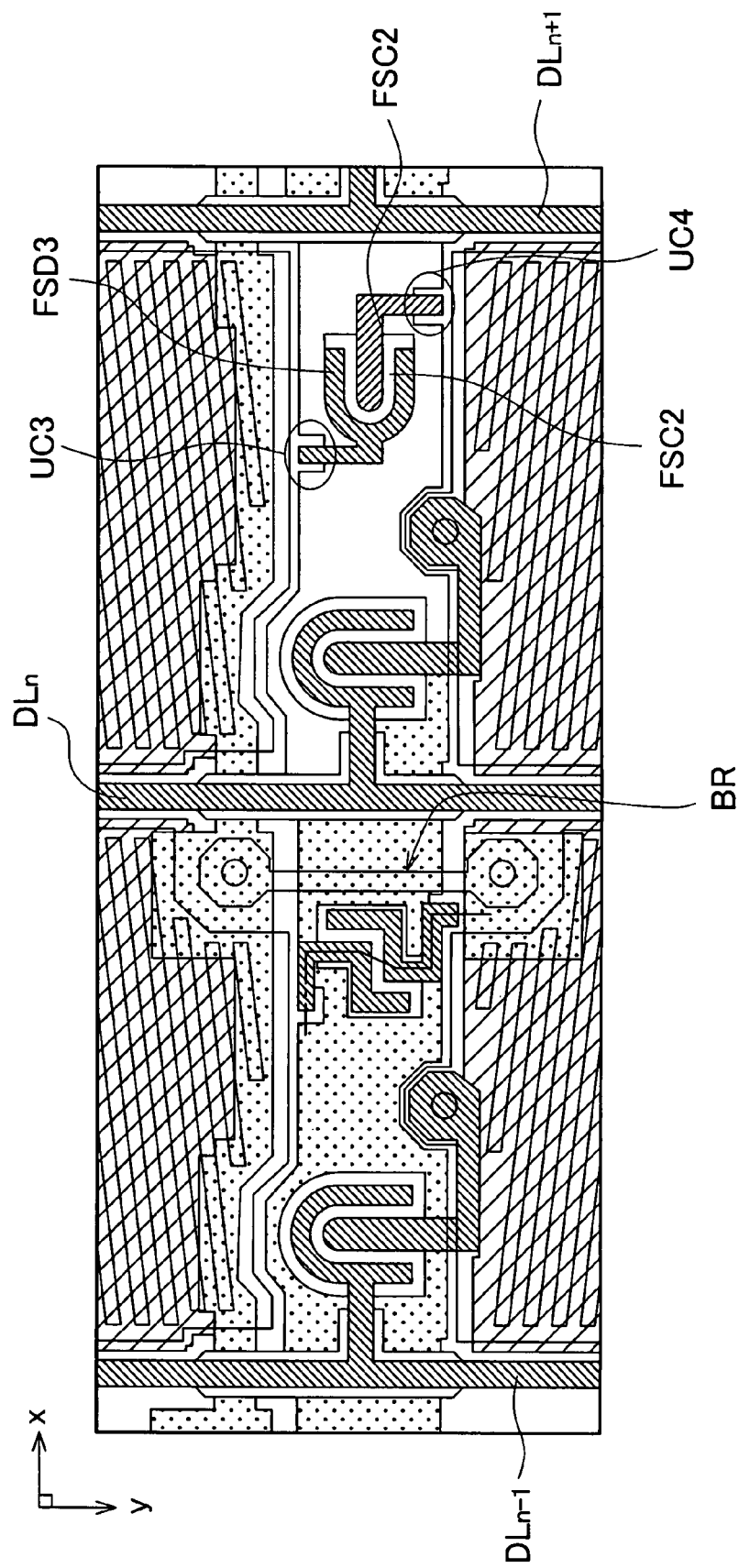
FIG. 10 is a schematic plan view for explaining a first modification of the TFT substrate of this embodiment.
Figure 11:
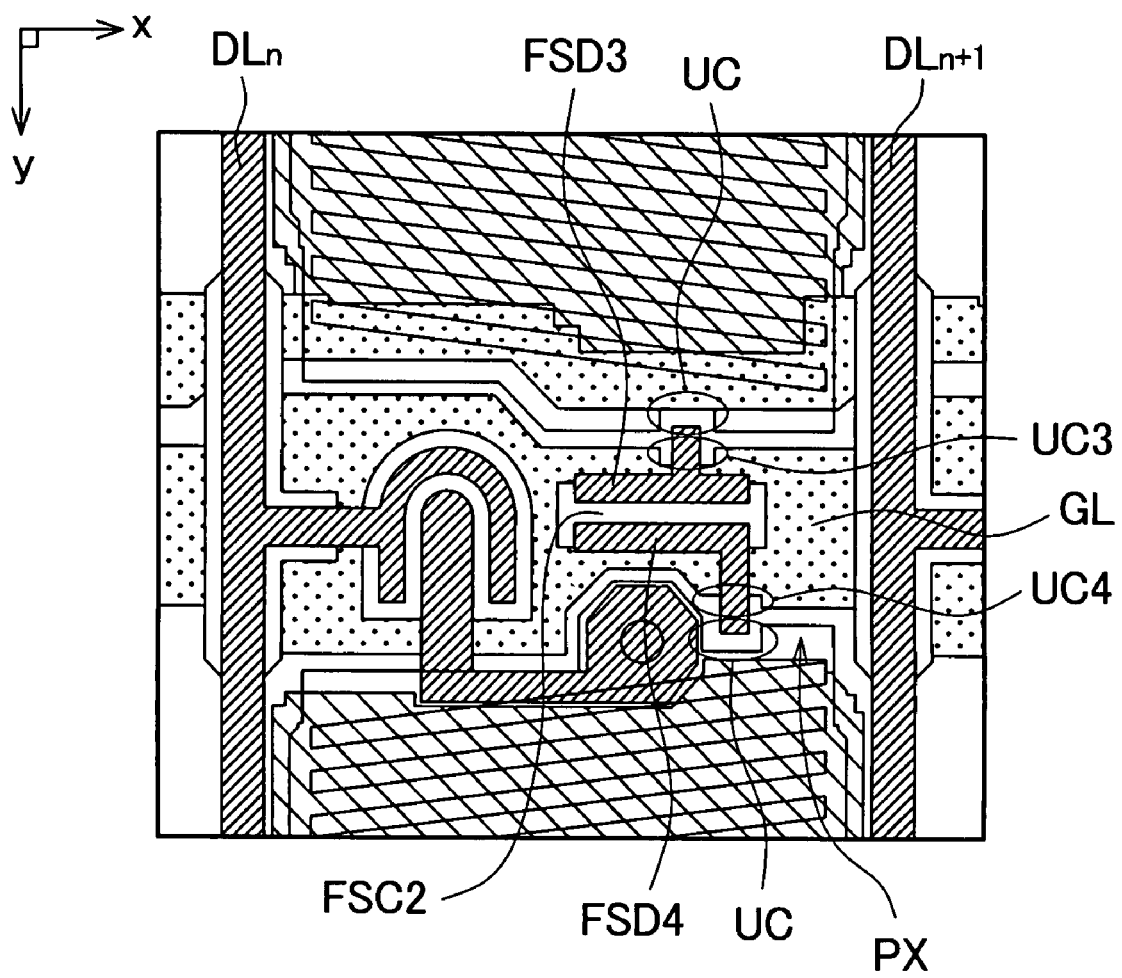
FIG. 11 is a schematic plan view for explaining a second modification of the TFT substrate of this embodiment.

FIG. 10 is a schematic plan view for explaining a first modification of the TFT substrate of this embodiment. FIG. 11 is a schematic plan view for explaining a second modification of the TFT substrate of this embodiment.

The TFT substrate of this embodiment can easily correct the point defect attributed to the malfunction of the first TFT element by providing the spare TFT element (second TFT element) having the largeness and the size of the occupied area or the channel width and the channel length of each TFT element when the substrate is viewed in a plan view to one pixel region in addition to the first TFT element which is used in an initial state, for example.

Further, in the TFT substrate of this embodiment, it is sufficient that the occurrence of the point defect, that is, the occurrence of the normally black display or the normally white display can be obviated and hence, and therefore it is needless to say that the various kinds of shapes are applicable to the second TFT element.

In the TFT substrate of this embodiment, for example, when a transistor element having a U-shaped drain electrode FSD3 is adopted as the second TFT element which is arranged in the second pixel region in which the bridge line BR is not arranged, for example, as shown in FIG. 10, the second TFT element may be laterally arranged in a state that straight portions of the drain electrode FSD3 extend in the x direction.

Further, the second pixel region in which the bridge line BR is not arranged has a larger area in which the second TFT element can be arranged compared to the first pixel region in which the bridge line BR is arranged. Accordingly, for example, as shown in FIG. 11, it is also possible to adopt a parallel transistor as a second TFT element which is arranged in the second pixel region.

Further, when the end portion of the drain electrode and the end portion of the source electrode of the second TFT element are arranged not to overlap the scanning signal line GL as viewed in a plan view, for example, as shown in FIG. 11, it is needless to say that the cutout portion UC may be formed not only in the scanning signal line GL but also in the pixel electrode PX. Due to such a constitution, it is possible to reduce a size of the cutout portion formed in the scanning signal line GL.

Further, it is needless to say that the shape of the second TFT element is not limited to the shapes shown in FIG. 6, FIG. 10 and FIG. 11, and the second TFT element may be formed in other shapes.

Further, in this embodiment, as the first TFT element, the transistor element having the U-shaped drain electrode SD1 (MSD) is exemplified. Further, a case in which the first TFT element is vertically arranged in a state that the straight portions of the drain electrode SD1 extend in the y direction is exemplified. However, it is needless to say that the shape of the first TFT element is also not limited to the shape shown in FIG. 6 and the like, and the first TFT element may be formed in other shapes.

Further, in this embodiment, the constitution of one pixel of the TFT substrate 1 is described by taking the liquid crystal display panel adopting the lateral-electric-field driving method in which one pixel of the TFT substrate 1 is constituted as shown in FIG. 3 to FIG. 5 as an example. It is needless to say, however, that the present invention is not limited to such a liquid crystal display panel, and the present invention is also applicable to a liquid crystal display panel in which one pixel has other constitution.

Although the present invention has been specifically explained heretofore in conjunction with the above-mentioned embodiment, it is needless to say that the present invention is not limited to the above-mentioned embodiment and various modifications are conceivable without departing from the gist of the present invention.

For example, in the above-mentioned embodiment, although the case in which the present invention is applied to the liquid crystal display device (liquid crystal display panel) is exemplified, it is needless to say that the present invention may be applied to the other display device. That is, provided that a display device includes a substrate in which a first TFT element used in an initial state and a second TFT element which is used when a malfunction occurs in the first TFT element are arranged in one pixel region surrounded by two neighboring scanning signal lines and two neighboring video signal lines, the present invention is applicable to any kinds of display device.

What is claimed is:

1. A display device, including:
a substrate on which a plurality of scanning signal lines, a plurality of video signal lines which stereoscopically intersects the plurality of scanning signal lines by way of an insulation layer, and TFT elements and pixel electrodes which are arranged in pixel regions each of which is surrounded by two neighboring scanning signal lines and two neighboring video signal lines are formed, wherein
the substrate arranges a first TFT element and a second TFT element in each pixel region in which the first TFT element and the second TFT element independently include a semiconductor layer, a drain electrode, and a source electrode respectively,
the respective semiconductor layers of the first and second TFT elements are arranged in each pixel region on a scanning signal line forming the pixel region so as to not protrude from the scanning signal line, the scanning signal line on which the respective semiconductor layers of the first and second TFT elements are arranged includes a cutout portion at which a width of the scanning signal line is narrowed when the substrate is viewed in a plan view, and end portions of the respective drain and source electrodes of the second TFT element are disposed on the cutout portion when the substrate is viewed in the plan view,
only either one of the first TFT element and the second TFT element in each pixel region is operated when a video signal is applied to the video signal lines and a scanning signal is applied to the scanning signal lines, and
the first TFT element and the second TFT element in each pixel region differ from each other in a largeness or a shape of an occupied area or a width and a length of the semiconductor layer of each TFT element when the substrate is viewed in a plan view.

2. A display device according to claim 1, wherein the drain electrode and the source electrode of the second TFT element include a region which overlaps the scanning signal line and a region which does not overlap the scanning signal line when the substrate is viewed in a plan view.

3. A display device according to claim 1, wherein the pixel electrode forms a cutout portion on a side thereof which faces the scanning signal line in an opposed manner when the substrate is viewed in a plan view.

4. A display device according to claim 1, wherein the substrate includes common electrodes which are arranged for the respective pixel regions and bridge lines each of which stereoscopically intersects the scanning signal line and is connected to the common electrodes arranged on both sides of the scanning signal line, the substrate includes first pixel regions each of which allows the common electrode to be electrically connected to the common electrode of other pixel region using the bridge line and second pixel regions each of which prevents the common electrodes from being connected to the common electrode of other pixel region, and the second TFT element which is arranged in the first pixel region and the second TFT element which is arranged in the second pixel region differ from each other in a largeness or a shape of an occupied area or a width and a length of the semiconductor layer of each TFT element when the substrate is viewed in a plan view.

5. A display device according to claim 4, wherein the second TFT element which is arranged in the first pixel region is arranged between the first TFT element which is arranged in the first pixel region and the bridge line.

6. A display device according to claim 5, wherein the second TFT element which is arranged in the first pixel region is a transistor element having a U-shaped drain electrode, and the second TFT element which is arranged in the second pixel region is a transistor element in which a drain electrode and a source electrode are arranged in parallel to each other.

7. A display device according to claim 1, wherein the first TFT element is a transistor element having a U-shaped drain electrode, and the second TFT element is a transistor element in which a drain electrode and a source electrode are arranged in parallel to each other.

8. A display device according to claim 1, wherein the first TFT element and the second TFT element are equal to each other in a value which is obtained by dividing the width of the semiconductor layer by the length of the semiconductor layer for each TFT element.

9. A display device according to claim 1, wherein the substrate constitutes one substrate of a liquid crystal display panel.

10. A display device according to claim 2, wherein the pixel electrode forms a cutout portion on a side thereof which faces the scanning signal line in an opposed manner when the substrate is viewed in a plan view.

11. A display device according to claim 2, wherein the substrate includes common electrodes which are arranged for the respective pixel regions and bridge lines each of which stereoscopically intersects the scanning signal line and is connected to the common electrodes arranged on both sides of the scanning signal line, the substrate includes first pixel regions each of which allows the common electrode to be electrically connected to the common electrode of other pixel region using the bridge line and second pixel regions each of which prevents the common electrodes from being connected to the common electrode of other pixel region, and the second TFT element which is arranged in the first pixel region and the second TFT element which is arranged in the second pixel region differ from each other in a largeness or a shape of an occupied area or a width and a length of the semiconductor layer of each TFT element when the substrate is viewed in a plan view.

12. A display device according to claim 3, wherein the substrate includes common electrodes which are arranged for the respective pixel regions and bridge lines each of which stereoscopically intersects the scanning signal line and is connected to the common electrodes arranged on both sides of the scanning signal line, the substrate includes first pixel regions each of which allows the common electrode to be electrically connected to the common electrode of other pixel region using the bridge line and second pixel regions each of which prevents the common electrodes from being connected to the common electrode of other pixel region, and the second TFT element which is arranged in the first pixel region and the second TFT element which is arranged in the second pixel region differ from each other in a largeness or a shape of an occupied area or a width and a length of the semiconductor layer of each TFT element when the substrate is viewed in a plan view.

13. A display device according to claim 10, wherein the substrate includes common electrodes which are arranged for the respective pixel regions and bridge lines each of which stereoscopically intersects the scanning signal line and is connected to the common electrodes arranged on both sides of the scanning signal line, the substrate includes first pixel regions each of which allows the common electrode to be electrically connected to the common electrode of other pixel region Using the bridge line and second pixel regions each of which prevents the common electrodes from being connected to the common electrode of other pixel region, and the second TFT element which is arranged in the first pixel region and the second TFT element which is arranged in the second pixel region differ from each other in a largeness or a shape of an occupied area or a width and a length of the semiconductor layer of each TFT element when the substrate is viewed in a plan view.

* * * * *